US009950296B2

(12) United States Patent
Nagano et al.

(10) Patent No.: US 9,950,296 B2
(45) Date of Patent: Apr. 24, 2018

(54) CARBON DIOXIDE SEPARATION AND CAPTURE APPARATUS AND METHOD OF CONTROLLING OPERATION OF CARBON DIOXIDE SEPARATION AND CAPTURE APPARATUS

(71) Applicant: Kabushiki Kaisha Toshiba, Minato-ku (JP)

(72) Inventors: Keita Nagano, Kawasaki (JP); Satoshi Saito, Yamato (JP); Masatoshi Hodotsuka, Saitama (JP); Mitsuru Udatsu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 129 days.

(21) Appl. No.: 14/732,926

(22) Filed: Jun. 8, 2015

(65) Prior Publication Data

US 2016/0082386 A1 Mar. 24, 2016

(30) Foreign Application Priority Data

Sep. 22, 2014 (JP) .................................. 2014-192850

(51) Int. Cl.
*B01D 53/62* (2006.01)
*B01D 53/14* (2006.01)
*B01D 53/78* (2006.01)

(52) U.S. Cl.
CPC ......... *B01D 53/62* (2013.01); *B01D 53/1412* (2013.01); *B01D 53/1475* (2013.01);
(Continued)

(58) Field of Classification Search
CPC . B01D 53/1475; B01D 53/62; B01D 53/1412
See application file for complete search history.

(56) References Cited

U.S. PATENT DOCUMENTS 3,967,937 A 7/1976 Hobbs
4,106,916 A 8/1978 Tuckett et al.
(Continued)

FOREIGN PATENT DOCUMENTS

CN 102713166 A 10/2012
CN 103505986 A 1/2014
(Continued)

OTHER PUBLICATIONS

Office Action dated Jun. 1, 2016 in Australian Patent Application No. 2015203510 (with Search Information Statement).
Office Action dated Sep. 7, 2016 in Australian Patent Application No. 2015203510.
Extended European Search Report dated Feb. 8, 2016 in Patent Application No. 15171410.2.
Hu Tianhai, "Optimizing Control of $CO_2$ Recovery Unit by DSC System", Guizhou Chemical Industry, Jun. 2004, vol. 29/Issue 3, Total 3 Pages, with English Abstract.

*Primary Examiner* — Jill A Warden
*Assistant Examiner* — Matthew D Krcha
(74) *Attorney, Agent, or Firm* — Oblon, McClelland, Maier & Neustadt, L.L.P.

(57) ABSTRACT

In a carbon dioxide separation and capture apparatus according to an embodiment, a control device calculates a flow rate range of a carbon dioxide gas based on the concentration of the carbon dioxide gas and an output range of a blower. The control device determines a flow rate of the carbon dioxide gas in which the sum of energy is the least based on relationships, corresponding to a preset target amount of carbon dioxide gas to be captured, between a flow rate of the carbon dioxide gas, and sum of energy obtained by summing the amount of heat to be supplied by a heating medium from the external, power of the blower and power of a pump. The control device controls output of the blower, an opening degree of the first flow rate control valve, and an opening degree of the second flow rate control valve.

4 Claims, 3 Drawing Sheets

(52) U.S. Cl.
CPC .... *B01D 53/78* (2013.01); *B01D 2252/20484* (2013.01); *B01D 2252/20489* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | |
|---|---|---|
| 4,111,218 A | 9/1978 | Hobbs |
| 2010/0319531 A1* | 12/2010 | Iijima ................ B01D 53/1412 95/11 |
| 2011/0135550 A1 | 6/2011 | Nagayasu et al. |
| 2013/0183218 A1 | 7/2013 | Hiwale et al. |
| 2013/0291717 A1 | 11/2013 | Nagayasu et al. |

FOREIGN PATENT DOCUMENTS

| | | |
|---|---|---|
| CN | 104039423 A | 9/2014 |
| EP | 2 335 802 A2 | 6/2011 |
| EP | 2 335 802 A3 | 6/2011 |
| JP | 2011-527 | 1/2011 |
| JP | 2011-528 | 1/2011 |
| WO | WO 2013/114488 A1 | 8/2013 |

* cited by examiner

CARBON DIOXIDE SEPARATION AND CAPTURE APPARATUS AND METHOD OF CONTROLLING OPERATION OF CARBON DIOXIDE SEPARATION AND CAPTURE APPARATUS

CROSS-REFERENCE TO RELATED APPLICATIONS

This application is based upon and claims the benefit of priority from Japanese Patent Application No. 2014-192850, filed Sep. 22, 2014; the entire contents of which are incorporated herein by reference.

FIELD

The present invention relates to a carbon dioxide separation and capture apparatus and a method of controlling operation of a carbon dioxide separation and capture apparatus.

BACKGROUND

In recent years, as one of effective measures against globally-concerned global warming, particular attention is given to a carbon dioxide capture and storage technique for capturing and storing a carbon dioxide gas contained in an exhaust gas. As an example of the technique, a carbon dioxide separation and capture apparatus has been considered, which causes an absorbing liquid to absorb carbon dioxide gas contained in combustion exhaust gas discharged from a thermal power plant or the like or carbon dioxide gas contained in process exhaust gas, separates the carbon dioxide gas from the exhaust gas, and captures the carbon dioxide gas.

The carbon dioxide separation and capture apparatus includes an absorption tower and a regeneration tower, for example. The absorption tower is configured to cause an absorbing liquid to absorb carbon dioxide gas contained in supplied exhaust gas and generate a rich liquid. The regeneration tower is configured to cause the rich liquid supplied from the absorption tower to release the carbon dioxide gas and generate a lean liquid. The lean liquid generated by the regeneration tower is supplied to the absorption tower, and the rich liquid is generated from the lean liquid. A heat exchanger, installed between the absorption tower and the regeneration tower, is configured to cause thermal exchange between the rich liquid to be supplied to the regeneration tower from the absorption tower and the lean liquid to be supplied to the absorption tower from the regeneration tower. The rich liquid supplied to the regeneration tower is heated by a steam generated by a reboiler from the absorbing liquid and then releases the carbon dioxide gas. The carbon dioxide gas released from the rich liquid is discharged from the regeneration tower. In this manner, the carbon dioxide separation and capture apparatus separates the carbon dioxide gas from the exhaust gas and captures the carbon dioxide.

The amount of the carbon dioxide gas captured by the carbon dioxide separation and capture apparatus is expressed by a product of an average amount of the carbon dioxide gas contained in the exhaust gas and an average rate of capturing the carbon dioxide gas. In a thermal power plant, a flow rate of exhaust gas or the concentration of carbon dioxide gas in the exhaust gas vary due to power control, a generation load, a method of operating a boiler, or other factors. The rate of capturing carbon dioxide can therefore fluctuate as well.

A partial capture method of capturing a predetermined amount of carbon dioxide even if a flow rate of exhaust gas or the concentration of carbon dioxide gas fluctuate has been considered.

However, if the amount of carbon dioxide gas to be captured is maintained at a predetermined target amount and energy required to capture the carbon dioxide gas increases, effectiveness in the measures against global warming can decrease.

DETAILED DESCRIPTION

Figure 1:
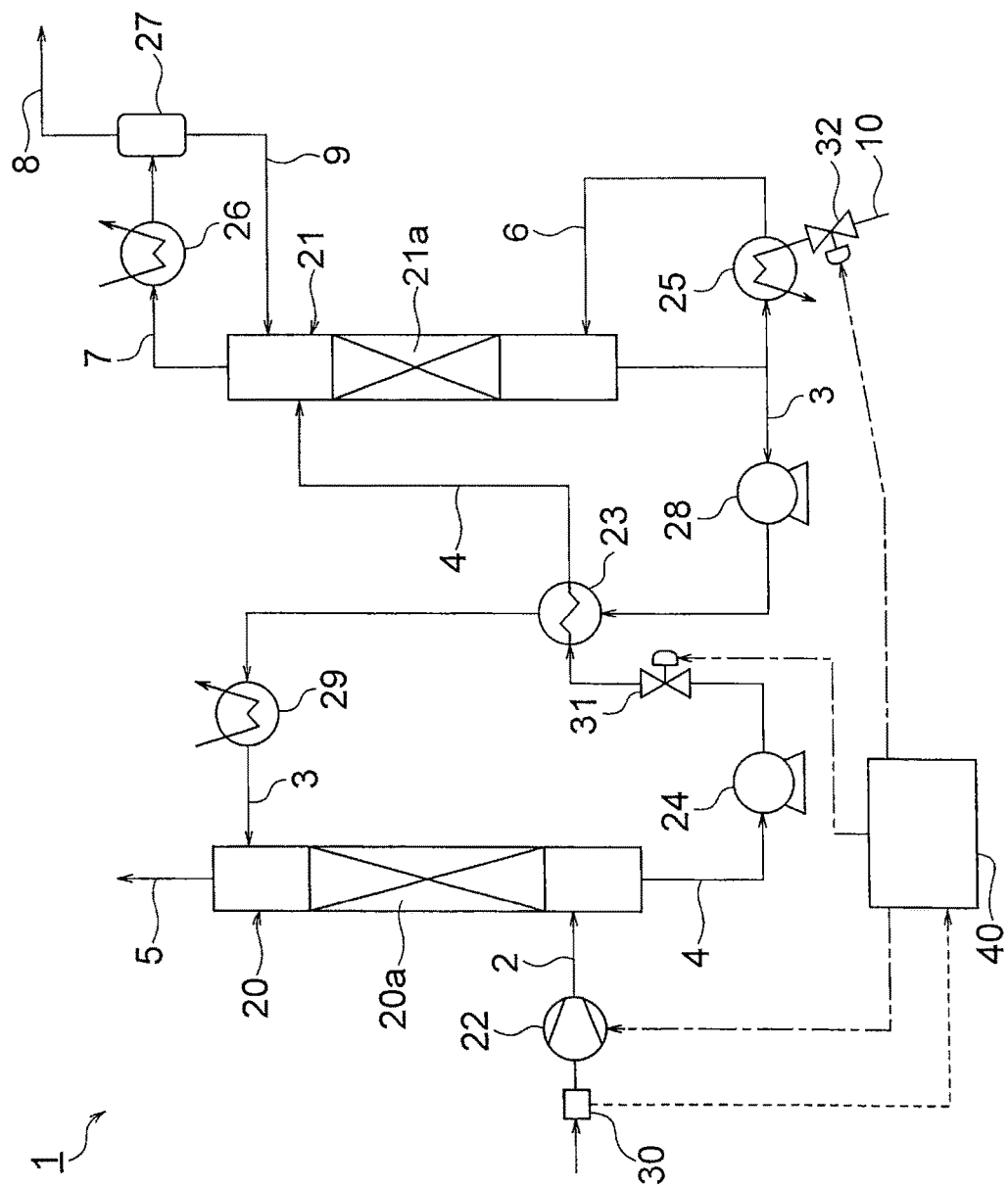
FIG. 1 is a diagram illustrating an overall configuration of a carbon dioxide separation and capture apparatus according to an embodiment of the invention.

A carbon dioxide separation and capture apparatus according to an embodiment includes an absorption tower, a regeneration tower, and a reboiler. The absorption tower causes absorbing liquid to absorb a carbon dioxide gas contained in an exhaust gas supplied by a blower. The regeneration tower causes the absorbing liquid supplied through a pump from the absorption tower to release the carbon dioxide gas. The reboiler uses a supplied heating medium to heat the absorbing liquid supplied from the regeneration tower and supplies a generated steam to the regeneration tower. The concentration of the carbon dioxide gas contained in the exhaust gas is measured by a concentration meter. A circulation flow rate of the absorbing liquid circulating between the absorption tower and the regeneration tower is controlled by a first flow rate control valve. A flow rate of the heating medium to be supplied is controlled by a second flow rate control valve. The blower, the first flow rate control valve, and the second flow rate valve are controlled by a control device. The control device includes a storage unit storing relationships, corresponding to a preset target amount of carbon dioxide gas to be captured, between a flow rate of the carbon dioxide gas contained in the exhaust gas, and sum of energy obtained by summing an amount of heat to be supplied by the heating medium from an external, power of the blower and power of the pump. In addition, the control device includes a flow rate determining unit configured to calculate a flow rate range of the carbon dioxide gas based on the concentration, measured by the concentration meter, of the carbon dioxide gas and an output range of the blower. From the calculated flow rate range, the flow rate determining unit determines the flow rate of the carbon dioxide gas in which the sum of energy is the least based on the relationship, stored in the storage unit, between the flow rate of the carbon dioxide gas and the sum of energy. Furthermore, the control device includes a control unit configured to control output of the blower, an opening degree of the first flow rate control valve, and an opening degree of the second flow rate control valve based on the flow rate, determined by the flow rate determining unit, of the carbon dioxide gas.

A method of controlling operation of an carbon dioxide separation and capture apparatus according to the embodiment is a method of controlling the operation of the carbon dioxide separation and capture apparatus that includes an absorption tower configured to cause an absorbing liquid to absorb a carbon dioxide gas contained in an exhaust gas supplied by the blower, a regeneration tower configured to cause the absorbing liquid supplied by a pump from the absorption tower to release the carbon dioxide gas, and a reboiler configured to use a supplied heating medium to heat the absorbing liquid supplied from the regeneration tower and supply a generated steam to the regeneration tower. In this method, relationships, corresponding to a preset target amount of carbon dioxide gas to be captured, between a flow rate of the carbon dioxide gas contained in the exhaust gas, and sum of energy obtained by summing an amount of heat to be supplied by the heating medium from the external, power of the blower and power of the pump are stored. In addition, a concentration of the carbon dioxide gas contained in the exhaust gas is measured. A flow rate range of the carbon dioxide gas is calculated based on the measured concentration of the carbon dioxide gas and an output range of the blower. The flow rate of the carbon dioxide gas in which the sum of energy is the least is determined based on the relationship between the sum of energy and the flow rate of the carbon dioxide gas, from the calculated flow rate range. Based on the determined flow rate of the carbon dioxide gas, the output of the blower, a circulation flow rate of the absorbing liquid, and a flow rate of the heating medium to be supplied are controlled.

Hereinafter, the carbon dioxide separation and capture apparatus according to the embodiment of the invention and the method of controlling the operation of the carbon dioxide separation and capture apparatus according to the embodiment of the invention will be described with reference to the accompanying drawings.

As illustrated in FIG. 1, a carbon dioxide separation and capture apparatus 1 includes an absorption tower 20 configured to cause an absorbing liquid to absorb a carbon dioxide gas contained in an exhaust gas 2 and a regeneration tower 21 configured to cause the absorbing liquid supplied from the absorption tower 20 to release the carbon dioxide gas and regenerate the absorbing liquid. The absorbing liquid circulates between the absorption tower 20 and the regeneration tower 21.

The exhaust gas 2 containing the carbon dioxide gas discharged from an external (installed outside the carbon dioxide separation and capture apparatus 1) such as a boiler (not illustrated) of a thermal power plant is supplied by a blower 22 to the absorption tower 20. In addition, a lean liquid 3 (absorbing liquid containing a relatively small amount of carbon dioxide gas absorbed therein) is supplied from the regeneration tower 21 to the absorption tower 20. The absorption tower 20 causes the supplied exhaust gas 2 to contact the lean liquid 3, causes the lean liquid 3 to absorb the carbon dioxide gas contained in the exhaust gas 2, and generates a rich liquid 4 (absorbing liquid containing a relatively large amount of carbon dioxide gas absorbed therein).

The absorption tower 20 may be configured as a countercurrent gas-liquid contact device. In this case, the absorption tower 20 includes a filling layer 20a. When the exhausting gas 2 is supplied to a lower portion of the absorption tower 20 and the lean liquid 3 is supplied to an upper portion of the absorption tower 20, the lean liquid 3 flowing downward from the upper portion and the exhausting gas 2 flowing upward from the lower portion come into contact with each other in the filling layer 20a. The generated rich liquid 4 is discharged from the lower portion of the absorption tower 20. The exhaust gas 2 contacting the lean liquid 3 releases the carbon dioxide gas and is discharged as non-carbon dioxide gas 5 from the upper portion of the absorption tower 20.

Types of the exhaust gas 2 to be supplied to the absorption tower 20 is not limited but may be combustion exhaust gas discharged from the boiler or process exhaust gas, as described above. The exhaust gas 2 may be supplied to the absorption tower 20 after being subjected to a cooling process when necessary. In addition, types of the absorbing liquid are not limited; for example, an amine aqueous solution such as monoethanolamine (MEA) or diethanolamine (DEA) may be used as the absorbing liquid.

A heat exchanger 23 is installed between the absorption tower 20 and the regeneration tower 21. A rich liquid pump 24 is installed between the absorption tower 20 and the heat exchanger 23. The rich liquid 4 discharged from the absorption tower 20 is supplied by the rich liquid pump 24 through the heat exchanger 23 to the regeneration power 21. The heat exchanger 23 causes thermal exchange between the rich liquid 4 to be supplied to the regeneration tower 21 from the absorption tower 20 and the lean liquid 3 to be supplied to the absorption tower 20 from the regeneration tower 21. The rich liquid 4 is heated to a predetermined temperature through the thermal exchange, while the lean liquid 3 serves as a heating source. In this case, the rich liquid 4, serving as a cooling source, cools the lean liquid 3 to a predetermined temperature.

A steam 6 is supplied to the regeneration power 21 from a reboiler 25 (described later). The regeneration tower 21 causes the supplied rich liquid 4 to contact the steam 6, causes the carbon dioxide gas absorbed in the rich liquid 4 to be released from the rich liquid 4, and generates the lean liquid 3.

The regeneration tower 21 may be configured as a countercurrent gas-liquid contact device. In this case, the regeneration tower 21 includes a filling layer 21a. When the rich liquid 4 is supplied to an upper portion of the regeneration tower 21 and the steam 6 is supplied from the reboiler 25 to a lower portion of the regeneration tower 21, the rich liquid 4 flowing downward from the upper portion and the steam 6 flowing upward from the lower portion come into contact with each other in the filling layer 21a. The generated lean liquid 3 is discharged from the lower portion of the regeneration tower 21. The steam 6 which has contacted with the rich liquid 4 contains carbon dioxide gas and is discharged from the upper portion of the regeneration tower 21.

The carbon dioxide separation and capture apparatus 1 illustrated in FIG. 1 further includes a gas cooler 26 and a gas-liquid separator 27. The gas cooler 26 cools and a condenses steam 7 discharged from the upper portion of the regeneration tower 21 and containing carbon dioxide gas, and generates condensed water. The gas-liquid separator 27 separates the condensed water and a carbon dioxide gas 8 from each other. A cooling medium such as cool water is supplied to the gas cooler 26 from an external, and the steam 7 containing the carbon dioxide gas is cooled by the cooling medium. At this time, the steam is condensed and becomes a condensed water 9. The carbon dioxide gas 8 separated by the gas-liquid separator 27 is compressed and stored in equipment (not illustrated). The condensed water 9 separated by the gas-liquid separator 27 is supplied to the regeneration tower 21 and mixed with the absorbing liquid.

The aforementioned reboiler 25 is connected to the regeneration tower 21. The reboiler 25 uses the supplied heating medium 10 to heat the lean liquid 3 supplied from the regeneration tower 21 before supplying the generated steam 6 to the regeneration tower 21. A part of the lean liquid 3 discharged from the lower portion of the regeneration tower 21 is supplied to the reboiler 25. On top of that, high-temperature steam is supplied as the heating medium 10 to the reboiler 25 from an external such as a turbine (not illustrated). The lean liquid 3 supplied to the reboiler 25 is heated after exchanging heat with the heating medium 10. The steam 6 is consequently generated from the lean liquid 3. Specifically, in the reboiler 25, the steam 6 is generated from the lean liquid 3 by heat included in the supplied high-temperature steam and supplied from the external. The generated steam 6 is supplied to the lower portion of the regeneration tower 21. The heating medium 10 having the heat supplied from the external is not limited to the high-temperature steam supplied from the turbine.

A lean liquid pump 28 is installed between the regeneration tower 21 and the heat exchanger 23. The lean liquid 3 discharged from the regeneration tower 21 is supplied by the lean liquid pump 28 through the aforementioned heat exchanger 23 to the absorption tower 20. The heat exchanger 23 causes thermal exchange between the lean liquid 3 to be supplied to the absorption tower 20 from the regeneration tower 21 and the rich liquid 4 to be supplied to the regeneration tower 21 from the absorption tower 20 in order to cool the lean liquid 3. A lean liquid cooler 29 is installed between the heat exchanger 23 and the absorption tower 20. A cooling medium such as cool water is supplied to the lean liquid cooler 29 from the outside that in turn further cools the lean liquid 3, which has been cooled by the heat exchanger 23, to a predetermined temperature.

The lean liquid 3 cooled by the lean liquid cooler 29 is supplied to the absorption tower 20, comes into contact with the exhaust gas flowing in a direction opposite to the lean liquid 3 again, and absorbs the carbon dioxide gas contained in the exhaust gas 2, thereby becoming the rich liquid 4. In the carbon dioxide separation and capture apparatus 1, the absorbing liquid circulates while repeatedly switching to serve as the lean liquid 3 and the rich liquid 4.

In the embodiment, as illustrated in FIG. 1, a concentration meter 30, installed on the upstream side of the blower 22, measures the concentration of the carbon dioxide gas contained in the exhaust gas 2 to be supplied to the absorption tower 20. In addition, a first flow rate control valve 31, installed between the rich liquid pump 24 and the heat exchanger 23, controls a circulation flow rate of the absorbing liquid circulating between the absorption tower 20 and the regeneration tower 21. A second flow rate control valve 32 is arranged to control a flow rate of the heating medium 10 to be supplied to the reboiler 25. The second flow rate control valve 32 is located on the upstream side of the reboiler 25 in a path of the heating medium 10 to be supplied to the reboiler 25.

A control device 40 is connected to the blower 22, the concentration meter 30, the first flow rate control valve 31, and the second flow rate control valve 32. The concentration of the carbon dioxide gas contained in the exhaust gas 2 is measured by the concentration meter 30 which transmits the measured concentration as a concentration signal to the control device 40.

Figure 2:
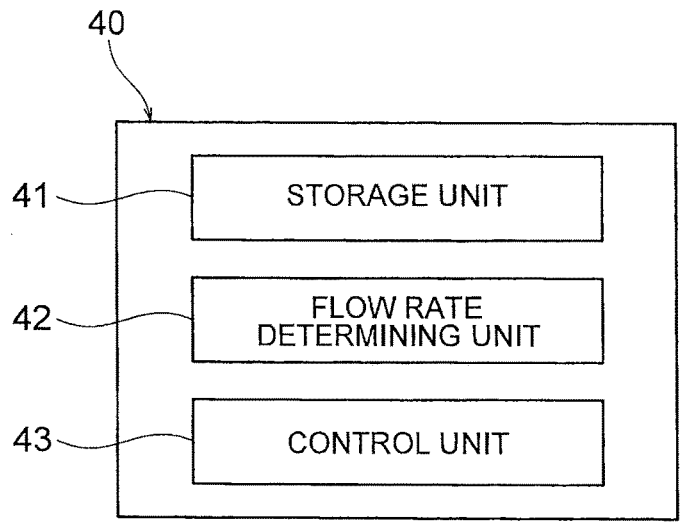
FIG. 2 is a diagram illustrating a control device included in the carbon dioxide separation and capture apparatus illustrated in FIG. 1.

The control device 40 controls the blower 22, the first flow rate control valve 31, and the second flow rate control valve 32 based on the concentration, measured by the aforementioned concentration meter 30, of the carbon dioxide gas contained in the exhaust gas 2. As illustrated in FIG. 2, the control device 40 includes a storage unit 41, a flow rate determining unit 42, and a control unit 43. The control unit 43 transmits control signals to the blower 22, the first flow rate control valve 31, and the second flow rate control valves 32 so as to respectively control output of the blower 22, an opening degree of the first flow rate control valve 31, and an opening degree of the second flow rate control valve 32.

Figure 4:
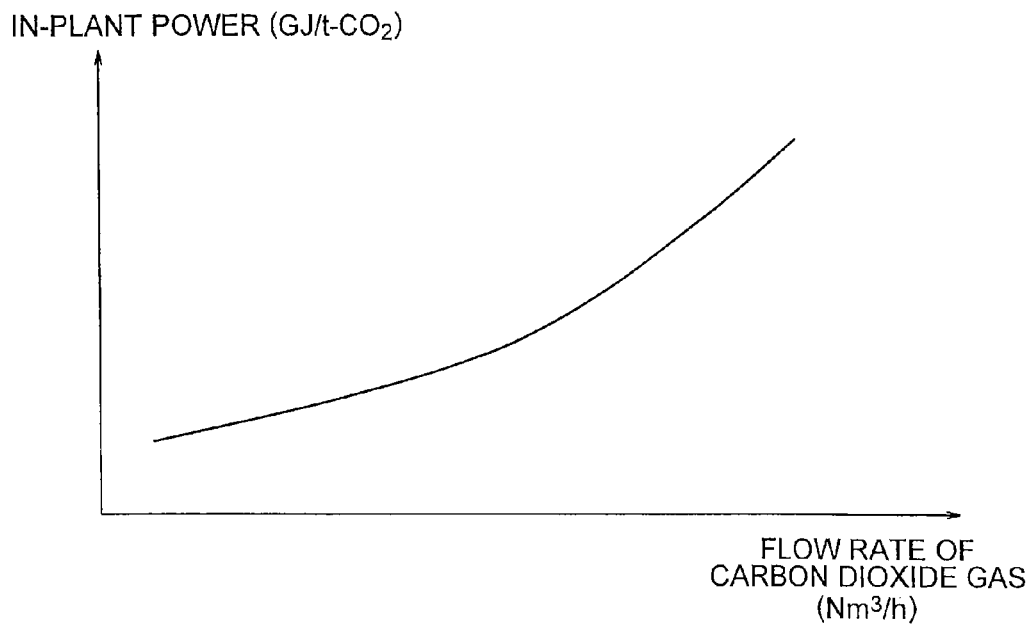
FIG. 4 is a graph illustrating a relationship between the flow rate of the carbon dioxide gas and in-plant power.
Figure 5:
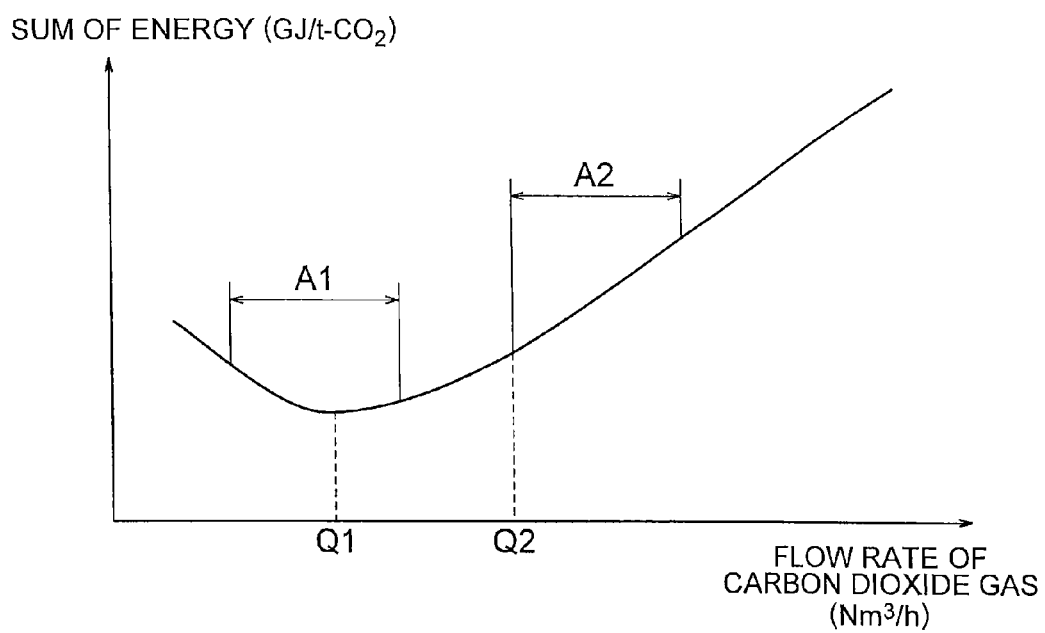
FIG. 5 is a graph illustrating a relationship between the flow rate of the carbon dioxide gas and sum of energy.

The storage unit 41 of the control device 40 stores a relationship (illustrated in FIG. 3) between a flow rate of the carbon dioxide gas and the amount of heat to be supplied from the external, a relationship (illustrated in FIG. 4) between the flow rate of the carbon dioxide gas and in-plant power, and a relationship (illustrated in FIG. 5) between the flow rate of the carbon dioxide gas and sum of energy. The flow rate of the carbon dioxide gas that is illustrated in FIGS. 3 to 5 represents the flow rate of the carbon dioxide gas contained in the exhaust gas 2 to be supplied by the blower 22 to the absorption tower 20.

Figure 3:
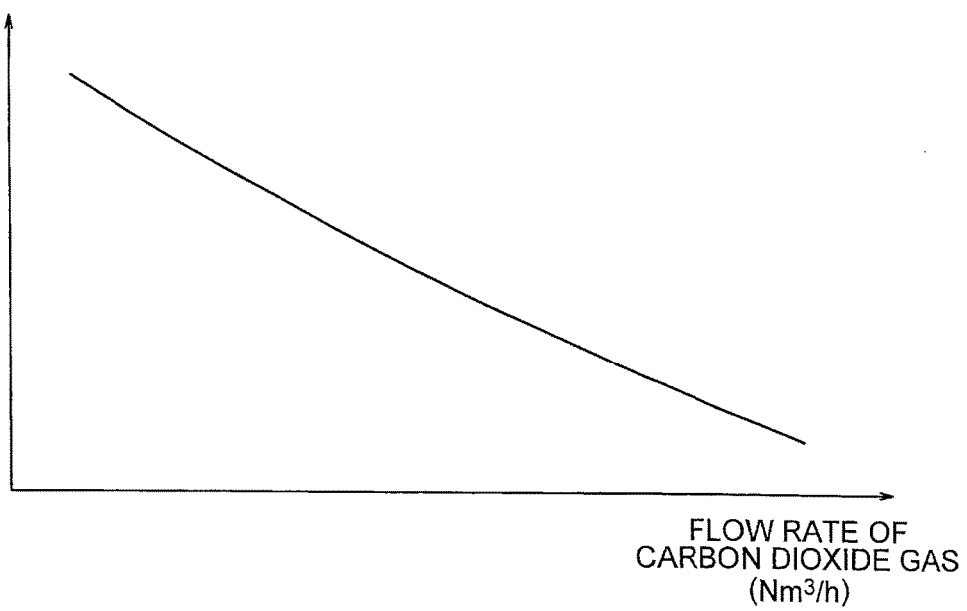
FIG. 3 is a graph illustrating a relationship between a flow rate of carbon dioxide gas and the amount of heart to be supplied from an external.

FIG. 3 illustrates the relationship between the flow rate of the carbon dioxide gas and the amount of heat to be supplied from the external. The relationship illustrated in FIG. 3 corresponds to a target amount of carbon dioxide gas to be captured in a predetermined time period (of, for example, one day) and is obtained when the ratio of the circulation flow rate of the absorbing liquid and the flow rate of the exhaust gas 2 to be supplied is constant. Specifically, the relationship illustrated in FIG. 3 corresponds to a predetermined target amount of carbon dioxide gas to be captured, and the storage unit 41 stores a plurality of relationships between the flow rate of the carbon dioxide gas and the amount of heat to be supplied from the external for each amount of carbon dioxide gas to be captured (or stores the relationships each corresponding to a different amount of carbon dioxide gas to be captured). If the ratio of the circulation flow rate of the absorbing liquid and the flow rate of the exhaust gas 2 to be supplied is set to be constant, the rich liquid 4 and the exhaust gas 2 can efficiently contact each other in the absorption tower 20.

The amount (illustrated in FIG. 3) of heat to be supplied from the external corresponds to the amount of heat to be supplied by the aforementioned heating medium 10 (for example, high-temperature steam) from the external to the reboiler 25. FIG. 3 illustrates the amount ($GJ/t-CO_2$) of heat per ton of carbon dioxide gas to be captured.

The rise in the flow rate (illustrated in FIG. 3) of the carbon dioxide gas increases the flow rate of the exhaust gas 2 to be supplied. In this case, since the ratio of the circulation flow rate of the absorbing liquid and the flow rate of the exhaust gas 2 to be supplied is set to be constant, the circulation flow rate of the absorbing liquid also increases. Since the target amount of carbon dioxide gas to be captured is fixed, the amount of heat to be supplied from the external decreases with an increase in the amount of the circulation flow rate of the absorbing liquid.

FIG. 4 illustrates the relationship between the flow rate of the carbon dioxide gas and the in-plant power. The relationship illustrated in FIG. 4 corresponds to the target amount of carbon dioxide gas to be captured in the predetermined time period and is obtained when the ratio of the circulation flow rate of the absorbing liquid and the flow rate of the exhaust gas 2 to be supplied is constant. Specifically, the relationship illustrated in FIG. 4 corresponds to the preset target amount of carbon dioxide gas to be captured. The storage unit 41 stores a plurality of relationships between the flow rate of the carbon dioxide gas and the in-plant power for each amount of carbon dioxide gas to be captured (or stores the relationships each corresponding to a different amount of carbon dioxide gas to be captured).

The in-plant power illustrated in FIG. 4 is the sum of power of the aforementioned blower 22, power of the rich liquid pump 24, and power of the lean liquid pump 28. FIG. 4 illustrates power (GJ/t–$CO_2$) per ton of carbon dioxide gas to be captured.

As the flow rate (illustrated in FIG. 4) of the carbon dioxide gas increases, the flow rate of the exhaust gas 2 to be supplied rises. Since the ratio of the circulation flow rate of the absorbing liquid and the flow rate of the exhaust gas 2 to be supplied is set to be constant, the circulation flow rate of the absorbing liquid also increases as well. The power of the blower 22 increases with the rise in the flow rate of the exhaust gas 2 to be supplied. The power of the rich liquid pump 24 and that of the lean liquid pump 28 increase with the increase in the circulation flow rate of the absorbing liquid.

FIG. 5 illustrates the relationship between the flow rate of the carbon dioxide gas and the sum of energy. The relationship illustrated in FIG. 5 corresponds to the target amount of carbon dioxide gas to be captured in the predetermined time period and is obtained when the ratio of the circulation flow rate of the absorbing liquid and the flow rate of the exhaust gas 2 to be supplied is constant. Specifically, the relationship illustrated in FIG. 5 corresponds to the preset target amount of carbon dioxide gas to be captured, and the storage unit 41 stores a plurality of relationships between the flow rate of the carbon dioxide gas and the sum of energy for each amount of carbon dioxide gas to be captured (or stores the relationships each corresponding to a different amount of carbon dioxide gas to be captured).

The sum of energy illustrated in FIG. 5 is sum of energy obtained by summing the amount (illustrated in FIG. 3) of heat to be supplied from the external and the in-plant power illustrated in FIG. 4. FIG. 5 illustrates energy (GJ/t–$CO_2$) per ton of carbon dioxide gas to be captured.

As illustrated in FIG. 5, as the flow rate of the carbon dioxide gas increases, the sum of energy is gradually reduced. However, if the flow rate of the carbon dioxide gas further increases, the sum of energy gradually becomes larger.

The flow rate determining unit 42 of the control device 40 determines the flow rate of the carbon dioxide gas based on the concentration, measured by the concentration meter 30, of the carbon dioxide gas.

Specifically, the flow rate determining unit 42 calculates a flow rate range of the carbon dioxide gas based on the measured concentration of the carbon dioxide gas and an output range of the blower 22. The blower 22 supplies, to the absorption tower 20, the exhaust gas 2 in the output range defined in specifications. Thus, the flow rate range of the carbon dioxide gas to be supplied to the absorption tower 20 is calculated by multiplying the output range by the concentration of the carbon dioxide gas.

In addition, the flow rate determining unit 42 selects, from among the relationships between the flow rate of the carbon dioxide gas and the sum of energy, a relationship corresponding to the preset target amount of carbon dioxide gas to be captured, the relationships being stored in the storage unit 41.

Then, the flow rate determining unit 42 determines, based on the selected relationship (FIG. 5) between the flow rate of the carbon dioxide gas and the sum of energy, a flow rate of the carbon dioxide gas in which the sum of energy is the least. For example, as illustrated in FIG. 5, if the calculated flow rate range of the carbon dioxide gas is a flow rate represented by A1, a flow rate, represented by Q1, of the carbon dioxide gas is determined as the flow rate in which the sum of energy is the least. If the calculated flow rate range of the carbon dioxide gas is a flow rate represented by A2, a flow rate, represented by Q2, of the carbon dioxide gas is determined as the flow rate in which the sum of energy is the least. FIG. 5 illustrates the relationship (characteristic curve) between the flow rate of the carbon dioxide gas and the sum of energy, while the relationship illustrated in FIG. 5 corresponds to the predetermined target amount of carbon dioxide gas to be captured. As long as the characteristic curve is satisfied, the predetermined target amount of carbon dioxide gas to be captured will be maintained.

The control unit 43 of the control device 40 controls the output of the blower 22, the opening degree of the first flow rate control valve 31, and the opening degree of the second flow rate control valve 31 based on the determined flow rate of the carbon dioxide gas.

Specifically, the control unit 43 calculates the flow rate of the exhaust gas 2 to be supplied, the calculation being based on the flow rate, determined by the flow rate determining unit 42, of the carbon dioxide gas and the concentration, measured by the concentration meter 30, of the carbon dioxide gas. Then, the control unit 43 controls the output of the blower 22 based on the calculated flow rate of the exhaust gas 2 to be supplied. Thus, the flow rate of the exhaust gas 2 to be supplied to the absorption tower 20 will be adjusted to a desired flow rate.

In addition, the control unit 43 calculates the circulation flow rate of the absorbing liquid based on the flow rate, determined by the flow rate determining unit 42, of the carbon dioxide gas, the concentration, measured by the concentration meter 30, of the carbon dioxide gas, and the aforementioned preset ratio of the circulation flow rate of the absorbing liquid and the flow rate of the exhaust gas 2 to be supplied. At this time, the flow rate of the exhaust gas 2 to be supplied is calculated based on the flow rate of the carbon dioxide gas and the concentration of the carbon dioxide gas, while the circulation flow rate of the absorbing liquid is calculated based on the flow rate of the exhaust gas 2 to be supplied and the aforementioned ratio. Then, the control unit 43 controls the opening degree of the first flow rate control valve 31 based on the calculated circulation flow rate of the absorbing liquid. Thus, the circulation flow rate of the absorbing liquid circulating between the absorption tower 20 and the regeneration tower 21 is controlled.

In addition, the control unit 43 calculates the amount of heat to be supplied from the external, the calculation being based on the flow rate, determined by the flow rate determining unit 42, of the carbon dioxide gas and the relationship (refer to FIG. 3), stored in the storage unit 41, between the flow rate of the carbon dioxide gas and the amount of heat to be supplied from the external. At this time, the control unit 43 selects the relationship corresponding to the preset target amount of carbon dioxide gas to be captured, from among the relationships, stored in the storage unit 41, between the flow rate of the carbon dioxide gas and the amount of heat to be supplied from the external and calculates the amount of heat to be supplied from the external based on the selected relationship.

Then, the control unit 43 calculates the flow rate of the heating medium 10 to be supplied based on the calculated amount of heat to be supplied from the external, and controls the opening degree of the second flow rate control valve 32 based on the calculated flow rate of the heating medium 10 to be supplied. Accordingly, the flow rate of the heating medium 10 to be supplied to the reboiler 25 is adjusted to the calculated flow rate of the heating medium 10 to be supplied.

Operation of the aforementioned configuration according to the embodiment will now be described.

The exhaust gas 2 containing the carbon dioxide gas is supplied by the blower 22 to the absorption tower 20. The lean liquid 3 supplied from the regeneration tower 21 is cooled by the heat exchanger 23 and the lean liquid cooler 29, and is supplied to the absorption tower 20. The exhaust gas 2 and the lean liquid 3 contact each other in the absorption tower 20. The lean liquid 3 subsequently absorbs the carbon dioxide gas contained in the exhaust gas 2 to become the rich liquid 4. The rich liquid 4 and the non-carbon dioxide gas 5 from which the carbon dioxide gas is removed are discharged from the absorption tower 20.

The rich liquid 4 discharged from the absorption tower 20 is supplied by the rich liquid pump 24 to the heat exchanger 23. In the heat exchanger 23, the rich liquid 4, after exchanging heat with the lean liquid 3, is heated to a desired temperature while the lean liquid 3 serves as a heating source.

The heated rich liquid 4 is supplied to the regeneration tower 21. The steam 6 is supplied from the reboiler 25 to the regeneration tower 21. In the regeneration tower 21, the rich liquid 4 contacts the steam 6 to be heated and subsequently releases the absorbed carbon dioxide gas to be lean liquid 3. The lean liquid 3 and steam containing the released carbon dioxide gas are discharged from the regeneration tower 21.

The steam 7 containing the carbon dioxide gas and discharged from the upper portion of the regeneration tower 21 is cooled by the cooling medium in the gas cooler 26. As a result, the steam 7 is condensed to become condensed water. The condensed water and the carbon dioxide gas 8 are separated from each other by the gas-liquid separator 27. The separated carbon dioxide gas 8 is compressed and stored in the equipment (not illustrated), while the separated condensed water 9 is supplied to the regeneration tower 21 and mixed with the absorbing liquid.

The lean liquid 3 discharged from the regeneration tower 21 is supplied by the lean liquid pump 28 to the heat exchanger 23 and cooled by the rich liquid 4 to a desired temperature as described above. The lean liquid 3 cooled by the heat exchanger 23 is further cooled by the cooling medium in the lean liquid cooler 29 to a desired temperature.

A part of the lean liquid 3 discharged from the regeneration 21 is supplied to the reboiler 25 and heated by the heating medium 10 supplied from the external. Thus, the steam 6 is generated and supplied to the regeneration tower 21.

The lean liquid 3 cooled in the lean liquid cooler 29 is supplied to the absorption tower 20, contacts the exhaust gas 2 again, absorbs the carbon dioxide gas, and thereby becomes the rich liquid 4. In this manner, the absorbing liquid circulates while repeatedly switching to serve as the lean liquid 3 and the rich liquid 4, and the carbon dioxide gas is separated from the exhaust gas 2 and captured.

During the time when the carbon dioxide separation and capture apparatus 1 is operated in the aforementioned manner, the following control is carried out so as to maintain the amount of the carbon dioxide gas to be captured at the preset target amount of carbon dioxide gas to be captured and reduce energy required to capture the carbon dioxide gas.

During the time when the carbon dioxide separation and capture apparatus 1 is operated, the concentration of the carbon dioxide gas contained in the exhaust gas 2 to be supplied to the absorption tower 20 is measured by the concentration meter 30.

The flow rate range of the carbon dioxide gas is calculated by the flow rate determining unit 42 of the control device 40 based on the measured concentration of the carbon dioxide gas and the output range of the blower 22.

In addition, the relationship corresponding to the preset target amount of carbon dioxide gas to be captured is selected by the flow rate determining unit 42 from among the relationships (refer to FIG. 5) stored in the storage unit 41 for each amount of carbon dioxide gas to be captured.

The flow rate of the carbon dioxide gas in which the sum of energy is the least is determined based on the relationship (FIG. 5), selected in the aforementioned manner, between the flow rate of the carbon dioxide gas and the sum of energy.

The flow rate of the exhaust gas 2 to be supplied is calculated by the control unit 43 of the control device 40 based on the determined flow rate of the carbon dioxide gas and the aforementioned concentration of the carbon dioxide gas. Then, the output of the blower 22 is controlled based on the calculated flow rate of the exhaust gas 2 to be supplied. Accordingly, the flow rate of the exhaust gas 2 to be supplied to the absorption tower 20 can be adjusted to a desired flow rate.

In addition, the circulation flow rate of the absorbing liquid is calculated based on the calculated flow rate of the exhaust gas 2 to be supplied and the ratio of the circulation flow rate of the absorbing liquid and the flow rate of the exhaust gas 2 to be supplied. Then, the opening degree of the first flow rate control valve 31 is controlled based on the calculated circulation flow rate of the absorbing liquid. Thus, the circulation flow rate of the absorbing liquid circulating between the absorption tower 20 and the regeneration tower 21 can be adjusted to a desired flow rate.

In addition, the amount of heat to be supplied from the external is calculated by the control unit 43 based on the determined flow rate of the carbon dioxide gas and the relationship (refer to FIG. 3), stored in the storage unit 41, between the flow rates of the carbon dioxide gas and the amount of heat to be supplied from the external. At this time, the relationship corresponding to the preset target amount of carbon dioxide gas to be captured is selected by the control unit 43 from among the relationships stored in the storage unit 41 for the each amount of carbon dioxide gas to be captured. The amount of heat to be supplied from the external is calculated based on the selected relationship.

Then, the flow rate of the heating medium 10 to be supplied is calculated from the calculated amount of heat to be supplied from the external. The opening degree of the second flow rate control valve 32 is controlled based on the calculated flow rate of the heating medium 10 to be supplied. Thus, the flow rate of the heating medium 10 to be supplied can be adjusted to a desired flow rate.

According to the embodiment, the concentration of the carbon dioxide gas to be supplied to the absorption tower 20 is measured, and the flow rate of the carbon dioxide gas contained in the exhaust gas 2 can be determined based on the measured concentration of the carbon dioxide gas and the relationship (refer to FIG. 5) corresponding to the target amount of carbon dioxide gas to be captured in the predetermined time period so that the determined flow rate of the carbon dioxide gas minimizes the sum of energy that is the sum of the amount of heat to be supplied from the external and the in-plant power. The output of the blower 22 is controlled based on the determined flow rate of the carbon dioxide gas, and consequently the flow rate of the exhaust gas 2 can be adjusted to a desired flow rate. In addition, the opening degree of the first flow rate control valve 31 is controlled and the circulation flow rate of the absorbing liquid can be adjusted to a desired flow rate, while at the same time the opening degree of the second flow rate control valve 32 is controlled, and the flow rate of the heating medium 10 to be supplied can be adjusted to a desired flow rate. Thus, while the amount of the carbon dioxide gas to be captured in the predetermined time period is maintained at the target amount of carbon dioxide gas to be captured, the energy required to capture the carbon dioxide gas can be reduced.

In addition, according to the embodiment, the flow rate of the exhaust gas 2 to be supplied can be calculated based on the determined flow rate of the carbon dioxide gas and the measured concentration of the carbon dioxide gas. Thus, the output of the blower 22 can be controlled based on the calculated flow rate of the exhaust gas 2 to be supplied, and the flow rate of the exhaust gas 2 to be supplied can be adjusted to a desired flow rate.

Further, according to the embodiment, the circulation flow rate of the absorbing liquid can be calculated based on the determined flow rate of the carbon dioxide gas, the measured concentration of the carbon dioxide gas, and the ratio of the circulation flow rate of the absorbing liquid and the flow rate of the exhaust gas 2 to be supplied. Thus, the opening degree of the first flow rate control valve 31 can be controlled based on the calculated circulation flow rate of the absorbing liquid, and the circulation flow rate of the absorbing liquid can be adjusted to a desired flow rate.

Moreover, according to the embodiment, the amount of heat to be supplied from the external can be calculated based on the determined flow rate of the carbon dioxide gas and the relationship (illustrated in FIG. 3) corresponding to the target amount of carbon dioxide gas to be captured in the predetermined time period. Thus, the flow rate of the heating medium 10 to be supplied can be calculated from the calculated amount of heat to be supplied from the external, and the opening degree of the second flow rate control valve 32 can be controlled based on the calculated flow rate of the heating medium 10 to be supplied. The flow rate of the heating medium 10 to be supplied can be consequently adjusted to a desired flow rate.

Furthermore, according to the embodiment, the storage unit 41 of the control device 40 stores the relationships between the flow rate of the carbon dioxide gas contained in the exhaust gas 2 and the sum of energy for each amount of carbon dioxide gas to be captured. The flow rate determining unit 42 selects the relationship corresponding to the preset target amount of carbon dioxide gas to be captured and determines the flow rate of the carbon dioxide gas. Thus, energy required to capture the carbon dioxide gas can be reduced for each of the stored amounts of carbon dioxide gas to be captured.

According to the aforementioned embodiment, the energy required to capture the carbon dioxide gas can be reduced while the amount of carbon dioxide gas to be captured can be maintained at the target amount of carbon dioxide gas to be captured.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The example in which the in-plant power is power obtained by summing the power of the blower 22, the power of the rich liquid pump 24, and the power of the lean liquid pump 28 has been described. The embodiment, however, is not limited to this. For example, the in-plant power may be power obtained by summing the power of the blower 22 and the power of the rich liquid pump 24.

The invention claimed is:

1. A carbon dioxide separation and capture apparatus comprising:
    a blower configured to supply an exhaust gas;
    an absorption tower configured to cause an absorbing liquid to absorb a carbon dioxide gas contained in the exhaust gas supplied by the blower;
    a regeneration tower configured to cause the absorbing liquid supplied by a pump from the absorption tower to release the carbon dioxide gas;
    a reboiler configured to heat the absorbing liquid supplied from the regeneration tower with a heating medium and to supply a steam generated therefrom to the regeneration tower;
    a concentration meter configured to measure concentration of the carbon dioxide gas contained in the exhaust gas;
    a first flow rate control valve configured to control a circulation flow rate of the absorbing liquid circulating between the absorption tower and the regeneration tower;
    a second flow rate control valve configured to control a flow rate of the heating medium to be supplied; and
    a control device configured to:
        to store a plurality of relationships, each corresponding to a preset target amount of carbon dioxide gas to be captured, between a flow rate of the carbon dioxide gas contained in the exhaust gas and a sum of energy, the sum of energy including an amount of heat to be supplied to the reboiler with the heating medium, power of the blower and power of the pump;
        calculate a flow rate range of the carbon dioxide gas based on the concentration, and an output range of the blower;
        determine the flow rate of the carbon dioxide gas in which the sum of energy is the least in the calculated flow rate range of the carbon dioxide based on one of the plurality of relationships corresponding to the target amount; and
        control output of the blower, an opening degree of the first flow rate control valve, and an opening degree of the second flow rate control valve based on the determined flow rate of the determined carbon dioxide gas in which the sum of energy is the least, so as to maintain the amount of the carbon dioxide gas to be captured at the target amount.

2. The carbon dioxide separation and capture apparatus according to claim 1,
    wherein the control device is configured to calculate a flow rate of the exhaust gas to be supplied based on the flow rate, of the carbon dioxide gas and the concentration of the carbon dioxide gas and to control the output of the blower based on the calculated flow rate of the exhaust gas to be supplied.

3. The carbon dioxide separation and capture apparatus according to claim 1, wherein the control device is configured to calculate the circulation flow rate of the absorbing liquid based on the flow rate of the carbon dioxide gas, the concentration of the carbon dioxide gas, and a preset ratio of the circulation flow rate of the absorbing liquid and the flow rate of the exhaust gas to be supplied and to control the opening degree of the first flow rate control valve based on the calculated circulation flow rate.

4. The carbon dioxide separation and capture apparatus according to claim 1,
wherein the control device is configured to store the plurality of relationships, each corresponding to the target amount of carbon dioxide gas to be captured, between the flow rate of the carbon dioxide gas contained in the exhaust gas and the amount of heat to be supplied by the heating medium to the reboiler,
wherein the control device is configured to calculate the amount of heat to be supplied to the reboiler based on the flow rate of the carbon dioxide and one of the plurality of relationships between the flow rate of the carbon dioxide gas and the amount of heat to be supplied to the reboiler and to control the opening degree of the second flow rate control valve based on the calculated amount of heat to be supplied to the reboiler.

* * * * *